Figure 1:
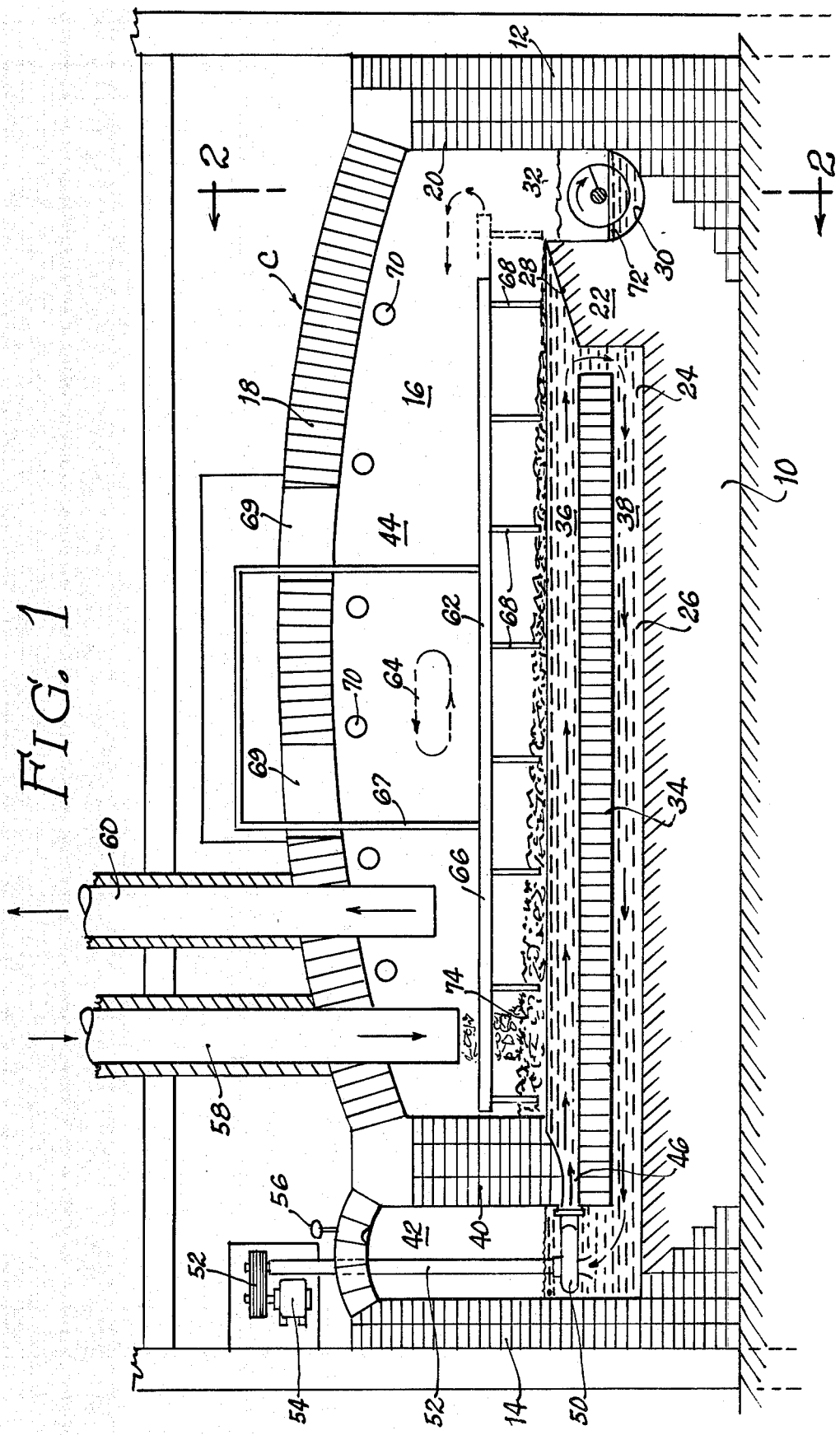

United States Patent [19]

Fassell

[11] 4,374,499
[45] Feb. 22, 1983

[54] TREATMENT DURING TRANSPORT OF SOLID WASTE

[75] Inventor: Wayne M. Fassell, Newport Beach, Calif.

[73] Assignee: Board of Control of Michigan Technological University, Houghton, Mich.

[21] Appl. No.: 957,439

[22] Filed: Nov. 3, 1978

Related U.S. Application Data

[63] Continuation of Ser. No. 772,302, Feb. 25, 1977, abandoned, which is a continuation of Ser. No. 581,902, May 29, 1975, abandoned.

[51] Int. Cl.³ ............................................. C22B 7/00
[52] U.S. Cl. .................................... 110/243; 210/527
[58] Field of Search ................. 110/8 E, 8 R; 210/70, 210/71, 179, 527

[56] References Cited

U.S. PATENT DOCUMENTS

| 849,379 | 4/1907 | Dorr | 210/527 |
| 3,770,419 | 11/1973 | Brown | 110/8 E |
| 3,841,239 | 10/1974 | Nakamura | 110/8 E |
| 3,871,286 | 3/1975 | Henriksen | 110/8 R |

Primary Examiner—Frank A. Spear

[57] ABSTRACT

The method of treatment during transport of solid waste by depositing the solid waste on the surface of a molten stream of lead traveling in one direction whereby organic material in the waste is subjected to thermal degradation, metals and other materials in the waste which are insoluble in the molten lead and of lesser specific gravity remain on the surface of the molten lead for removal and recovery while metals and other materials which are soluble in the molten lead dissolve in the molten lead for separation from the remainder while metal and materials which are insoluble in the molten lead and of higher specific gravity fall to the bottom of the stream of molten lead.

6 Claims, 2 Drawing Figures

TREATMENT DURING TRANSPORT OF SOLID WASTE

This application is a continuation of pending prior application Ser. No. 772,302, filed on Feb. 25, 1977 of Wayne Martin Fassell for "Treatment During Transport of Solid Waste" which was in turn a continuation of prior application Ser. No. 581,902, filed May 29, 1975 of Wayne Martin Fassell for "Treatment During Transport of Solid Waste" both abandoned.

This invention relates to a method and apparatus for processing solid waste and it relates more particularly to a method and apparatus for transport of solid waste and wherein the means for transport is effective, during transport, to convert such solid waste to usuable or easily disposable by-products.

Various techniques have been proposed for disposal of solid waste which include sewage, industrial waste, garbage and the like, all of which have raised serious ecological problems. For the most part, such waste has been destroyed by incineration but before the waste can be burned, it is necessary to expend a considerable amount of energy for removal of better than 90% of the water contained therein. In the absence of sophisticated devices for the treatment of gases coming off, undesirable pollutants are introduced into the atmosphere. Means must be provided for disposal of the ash, and valuable components such as metals and the like are lost by volatilization or oxidation, or are otherwise difficult to recover from the ash.

More recently processes of wet oxidation have been adapted for combustion of organic waste wherein pretreatment to reduce the waste to a dry state is not required. However, such wet oxidation processes are more or less restricted to the treatment of organic waste and therefore makes wet oxidation techniques unavailable for disposal of major proportions of solid waste.

It is an object of this invention to provide a new and novel transport wherein use is made of a transport medium that is effective to accept solid waste and deliver usable or easily disposable products from which valuable components, such as energy, metals and commercially valuable by-products are produced.

Figure 2:
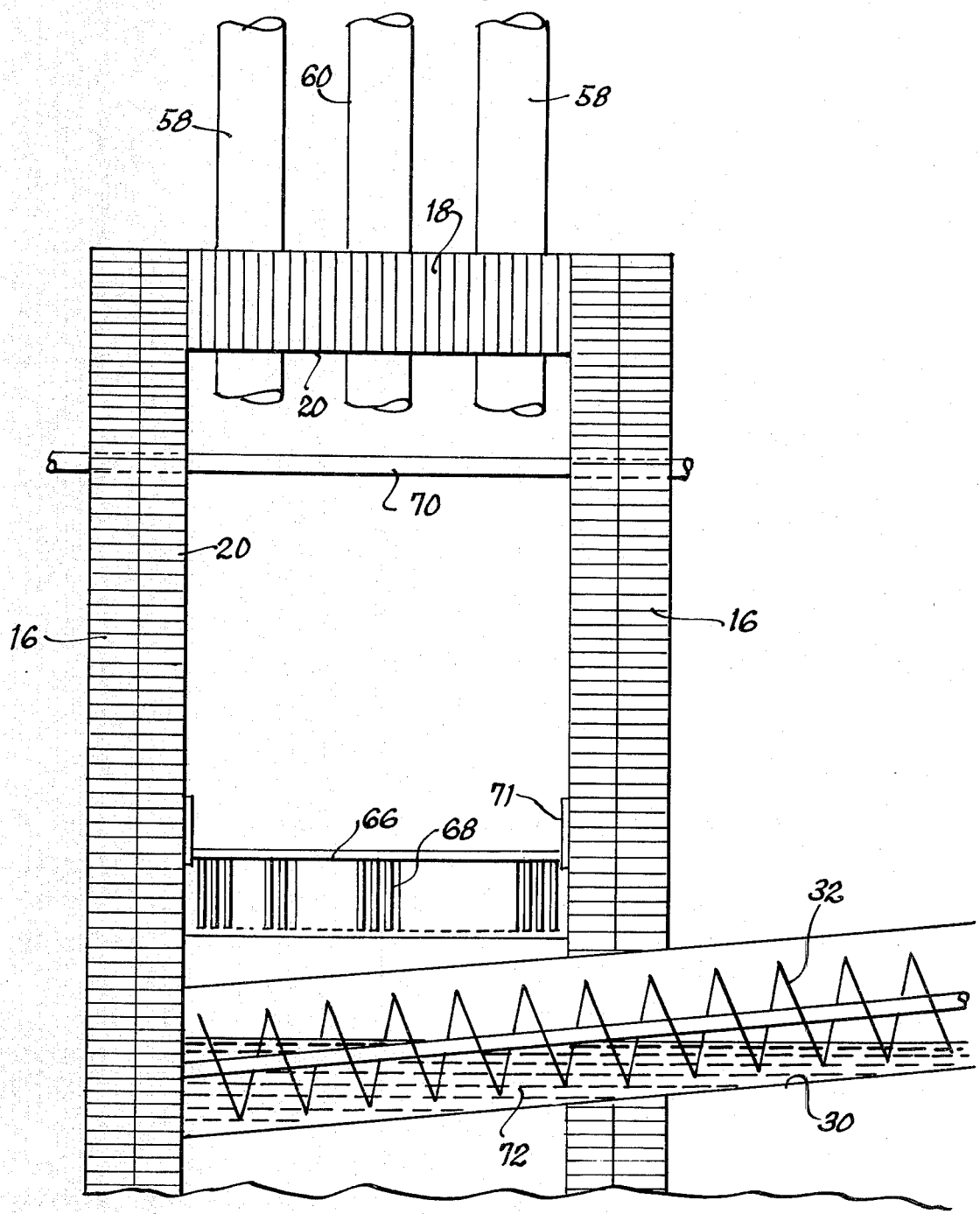

These and other objects and advantages of this invention will hereinafter appear and for the purposes of illustration, but not of limitation, an embodiment of the invention is shown in the accompanying drawing in which:

FIG. 1 is a schematic sectional view lengthwise through a pyrolysis-transport device embodying the features of this invention; and FIG. 2 is a schematic sectional elevational view taken along the line 2—2 of FIG. 1.

The invention will hereinafter be described with reference to the apparatus and its utilization in the treatment of waste which, in addition to organic matter, such as human waste, waste paper, plastic containers and other organic materials, includes metallic, inorganic and the like waste or scrap, as will hereinafter be described in an illustrative example of the utilization of the process and apparatus of this invention.

First a general description will hereinafter be given of the apparatus whereafter description will be made of the utilization of the described apparatus in the transport and treatment of solid waste.

Referring now to the drawing, illustration is made of an elongate chamber C of substantially rectangular shape having a horizontally disposed bottom wall 10, end walls 12 and 14, side walls 16, and a top wall 18, all of which are internally lined with refractory brick 20.

Spaced inwardly a short distance from the foot end of the chamber C, the bottom wall 10 is provided with a wall portion 22 which extends upwardly for a short distance across the width of the chamber and which functions as a dam which, with the opposite end of the end wall 14, defines a trough 24 adapted to be filled with a bath 26 of molten lead. The top wall 28 of the dam slopes gradually upwardly from the foot end of the chamber and terminates in a crosswise extending trough 30 in which a screw 32 is mounted for rotational movement to effect lateral displacement of solid material overflowing the dam 28 into the trough 30.

A septum 34 is positioned within the trough 24 to extend horizontally crosswise of the chamber at a level below the top of the dam but above the bottom wall 10 to separate the lead bath into an upper zone 36 and a lower zone 38 with the ends of the septum 34 spaced from the end wall 14 of the chamber and the dam 22 to define passageways communicating the upper zone 36 with the lower zone 38 thereabout.

A dividing wall 40 extends from the top wall 18 downwardly to the septum 34 to subdivide the chamber into a combustion chamber 42 and a pyrolysis chamber 44 with a weir which may be in the form of a continuous slot or preferably a plurality of laterally spaced apart passages 46 communicating the combustion chamber 42 with the pyrolysis chamber 44 below the level of the bath of molten lead.

One or more pumps 50, having inlets submerged below the level of the molten lead and outlets communicating with the passages 46, operate to re-circulate the molten lead from the combustion end, through the passages 46 into the pyrolysis chamber to provide for continuous flow of the molten lead forwardly over the top of the septum 34, down the foot end between the septum and the dam and back below the bottom of the septum to the pump for continuous re-circulation. The pump or pumps are operatively connected through drive mechanism 52 to a driving motor 54 located outside of the chamber.

The combustion chamber 42 is provided with one or more burners 56, such as Selas radiant heat burners, spaced laterally across the top of the chamber for the introduction of heat into the chamber in an amount sufficient to maintain the lead at the desired molten temperature.

Solid waste, preferably purged of oxygen, is introduced into the pyrolysis chamber 44 through one or more inlets 58 located above the upstream or head end of the lead bath, adjacent the dividing wall 40. Gases and vapors generated in the pyrolysis chamber are vented from the chamber through outlets 60 which are also preferably located adjacent the inlets in the head end of the pyrolysis chamber. The inlets are preferably in the form of openings across the bath which extend through the top wall 18 for gravitational feed of the solid waste downwardly onto the surface of the bath, across the width thereof.

The location of the outlets 60 is not critical as long as the outlet communicates with the vapor space above the lead bath. Thus the outlet can extend through the side walls of the chamber but it is preferred to design the unit with the outlets extending through the top wall for communication with the uppermost portions of the vapor space adjacent the inlets.

Located above the bath, in the pyrolysis chamber, is a rake 62 mounted for reciprocal movement along a rectangular or elliptical path, illustrated by the broken line 64 in the center of the pyrolysis chamber. The movement of the rake includes a forward stroke, when the rake is in the lowermost position, and a backward return stroke, when in the raised position, with the rake moving from the lowered to raised position at the end of its forward stroke and from the raised to lowered position at the end of its backward stroke.

The rake is in the form of a horizontally disposed frame 66 having longitudinally spaced apart, crosswise extending blades 68 or fingers depending upon the frame, with the blades or fingers being dimensioned to approximately reach the top of the bath when in lowered position and to clear the layer of waste on the surface of the bath, when in raised position, so that the rake will engage the layer of material on the surface of the bath for positive forward displacement during its forward stroke and will be free of the layer during its return backward stroke. The longitudinal spacing between the rows of blades or fingers is not significant but the rake is preferably designed so that when in retracted position, the leading row of blades or fingers will be spaced from the crest of the dam 26 by an amount corresponding to the length of stroke so that the forward row of blades or fingers will operate to sweep solids from the top of the dam for displacement over the crest into the laterally extending trough 30. Means, such as hanger 67, mounted for reciprocal movement through slots 69 in the roof 18, are provided for actuating the rake in the described reciprocal movement along the track 71 provided on the side walls of the pyrolysis chamber with actuating means (not shown) raising and lowering the hangers and for actuating the rake in the forward direction, when in lowered position, and in the rearward direction, when in raised position.

Heat exchange members, in the form of tubular members 70, are provided in the vapor space below the arched top wall of the combustion chamber for the circulation of hot combustion gases or fluid therethrough to add heat, when necessary, to the pyrolysis section or for circulation of a heat exchange medium therethrough to add heat or to extract heat when necessary from the pyrolysis section.

Molten lead 72 is also provided in the trough 30 in an amount to submerge at least a part of the conveyor screw. Such molten lead can be derived from the bath by overflow over the dam or by entrainment with material swept over the dam but it is preferred separately to supply the molten lead to the trough and to make use of radiant or the like separate heating elements to maintain the lead in the molten state.

Having described the basic construction of the molten lead transport for simultaneous thermal treatment of solid waste and delivery of residual components for the continuous treatment and disposal of solid waste, an illustrative example will hereinafter be given for utilization of the described equipment with reference to a typical mix of residential and industrial waste collected in a municipality.

No pre-sorting for the removal of metal, glass, ceramics, rubber, plastics and the like is required. The municipal waste is however subjected to pre-treatment, when necessary, to reduce the water content to below 30% and preferably below 10% by weight. This can be accomplished by filtration, decantation or by the use of classifiers and the like conventional unit processing means for the collection of solids. In order to minimize and preferably prevent introduction of oxygen by entrainment with the waste, it is the preferred practice of this invention to purge the waste with steam or with non-oxidizing gases exhausted from the chamber to effect removal of entrained oxygen before introduction into the chamber.

The resulting solid waste, in addition to the organic matter, will contain varying amounts of metal in the form of parts, scrap, waste and the like; glass or ceramics in the form of broken bottles, glasses, dishes and the like, as well as various rubber and plastic materials in the form of wrappings, containers, etc. Metals that enter the system through the introduction of solid waste may include metals which are insoluble in molten lead, such as iron, copper, aluminum, cobalt, tungsten and tungsten carbide, and nickel; metals which are soluble in molten lead, such as lead, tin, zinc, cadmium, silver, gold and metals of the platinum group.

The solid waste is introduced intermittently or continuously through the inlet and comes to rest on the surface of the molten lead bath to form a layer 74 more or less uniformly distributed over the width of the bottom adjacent the head end.

The molten lead bath is maintained at a temperature above the melting point temperature of the lead and preferably at a temperature within the range of 1166°–1600° F. and it is circulated to provide a rate of flow to traverse the melt of the bath in from 1 to 10 minutes. As a practical matter, it is desirable to maintain the molten lead bath at a temperature above 1325° F. for the purpose of minimizing uncontrolled combustion by reason of the presence of hydrogen but it is preferred to limit the upper range to a temperature below the temperature at which benzene, xylene, toluene and hydrocarbons are degraded and release hydrogen, or less than 1450° F. Within this preferred temperature range, a rate of flow for traversing the length of the bath in $2\pm1$ minute is sufficient.

The solid waste introduced onto the bath will generally travel with the flow of molten lead from the head end to the foot end of the pyrolysis chamber. As the solid waste travels with the molten lead bath, the components thereof will be raised in temperature by an amount sufficient to cause thermal decomposition of the organic matter to a charred state. Inorganic substances which thermally decompose at such elevated temperatures will be reduced to solid and gaseous components. Materials which are insoluble in molten lead, melt at a temperature above the temperature of the bath or are incompatible with lead in the molten state, and have a specific gravity less than that of molten lead, such as glass, ceramics and metals such as iron, copper, aluminum, cobalt and nickel, will float on the surface of the molten lead bath for conveyance to the dam. Those materials and metals such as lead, tin, cadmium, silver, gold and platinum groups, zinc and the like, which are soluble in molten lead, dissolve in the lead bath to become a part thereof. The few metals and inorganic substances that are insoluble in the molten lead and of higher specific gravity than molten lead, such as tungsten and tungsten carbide, will collect at the bottom of the bath along the lower zone.

Thus, as schematically illustrated in the drawing, the thickness of the layer 74 of material on the surface of the bath will gradually diminish until the composition of the layer approaching the dam will be composed primarily of charred organics, inorganic and metallic substances that are insoluble in the lead bath and of less specific gravity than that of molten lead.

The amount of lead entering the system from the solid waste generally will correspond with the amount lost from the bath by volatilization or by entrainment with the char or other solids removed as residue from the system. In the event that the amount of lead in the solid waste is not sufficient to replace that which is lost, additional lead can be added as a metal through the inlet. Periodically, the lead bath can be refined for removal and recovery of dissolved metals which are allowed to accumulate in solution in the bath but it is preferred to by-pass or periodically to remove a small proportion of the molten lead bath to effect the refinement of the lead and removal of accumulated solubles from the bath. Such separation can be effected by well known metallurgical processes.

In response to the thermal conditions to which the solid waste is subjected during molten lead transport, moisture present in the waste is converted into steam and organics are subjected to thermal breakdown resulting in the generation of vapors in an amount to maintain the pressure conditions existing within the chamber at or slightly above ambient pressure. It is desirable to maintain such positive pressure conditions within the chamber to prevent inflow of oxygen containing air and to maintain substantially inert atmospheric conditions within the chamber. Under these conditions, it is safe to expose the hot char to the superheated steam, derived either from the moisture vaporized from the solid waste or introduced to the char from without the chamber to produce additional CO and $H_2$, by a water-gas reaction, as a product of the process.

Gases generated within the chamber under the conditions described have been analyzed as being composed of the following, in percent by volume:

| | |
|---|---|
| CO | 25 |
| $CO_2$ | 19 |
| $H_2$ | 25 |
| $CH_4$ | 19 |
| Ethylene | 11 |
| Higher hydrocarbons | 1 |

Such gases have been analyzed to have a BTU of about 550 per cubic foot and can be used as an energy source for the burners to make the process self-sufficient and for fuel left over for use in the gas supply lines of the municipality.

The rake, including the blades and fingers or prongs, should be fabricated of a high temperature, corrosion resistant metal, such as a chromium alloy, as represented by Chromalloy 330.

The mechanical rake 62 engages the layer of solids floating on the surface of the lead bath to displace the solids towards the dam and then over the dam into the trough 30.

The screw conveyor 32, operating in the bottom of the trough 30, is partially submerged in molten lead 72, added or otherwise derived from the lead bath, by entrainment with the material swept over the dam. Radiant heaters (not shown) are used to keep the lead in the trough in the molten state.

It is preferred to mount the trough 30 with an upward incline at a pitch to length ratio for gradual decrease in the depth of the lead bath in the trough with termination of the lead bath before termination of the feed screw whereby, at the delivery end, the screw will be completely free of the molten lead. This enables molten lead to drain back into the bath while the solids continue to be displaced by the screw for a distance free of the molten lead.

The length of the trough 30 and the operation of the screw 32 is preferably regulated to provide for exposure of the material conveyed for an additional 5 to 20 minutes to the molten lead in the trough. This operates to achieve the additional exposure of thermally decomposable material for additional time under a state of agitation during movement to maximize exposure to the molten lead.

The pyrolysis chamber, including the trough 30, is maintained under inert conditions at all times during thermal treatment of the materials introduced. The conditions within the pyrolysis chamber governing the rate of flow and the temperature of the bath can be controlled by the rate of feed of the solid waste or the addition of heat from the burners in the combustion chamber or heaters within the pyrolysis chamber. These can be effectively monitored in response to control by the temperature of the lead bath.

It will be apparent from the foregoing that there is provided a new and novel combination of conveyor and pyrolysis means by which solid waste can be processed for disposal of the waste while at the same time generating by-products of considerable value thereby effectively to reduce the cost of waste disposal. By reason of the maintenance of the conditions for pyrolysis under an inert or reducing atmosphere, the metallic components are recoverable from the system in a usable form which requires little by way of additional processing technique for recovery.

It will be understood that changes may be made in the details of construction, arrangement and operation without departing from the spirit of the invention, especially as defined in the following claims.

I claim:

1. A device for treatment in transport of solid waste comprising an elongate enclosure, a trough extending lengthwise in the bottom portion of said enclosure for containing a bath of molten lead, means for imparting linear flow of the molten lead along the top side of the bath from a head end portion to a foot end portion of the bath, heating means for maintaining the lead in the bath in the molten state, inlet means overlying the head end portion of the bath of molten lead for the introduction of solid waste onto the underlying surface of the bath, outlet means communicating with a portion of the area within the enclosure above the bath for exhausting gases and vapors generated upon pyrolysis of organic material in the solid waste during movement with the bath from the head end portion to the foot end portion, and means for removal of residual solids from the bath at the foot end portion, and which includes a separating wall adjacent the head end portion of the bath, with the wall extending downwardly from the top of the enclosure to a level below the level of molten lead in the bath to subdivide the enclosure into a heating chamber and a pyrolysis chamber and to form a weir at the head end portion of the bath, said molten lead being exposed directly in both of said heating and pyrolysis chambers and said chambers being isolated one from the other except through said molten lead, said heating means being exposed to the interior of said heating chamber for introducing heat to said chamber and directly to the molten lead therein, and said means for imparting linear flow to the molten lead comprising a pumping means for displacement of the molten lead from the heating chamber through the weir into the pyrolysis chamber.

2. A device as claimed in claim 1 in which the outlet means communicates with the enclosed vapor space above the bath of molten lead adjacent the head end portion.

3. A device for treatment in transport of solid waste comprising an elongate enclosure, a trough extending lengthwise in the bottom portion of said enclosure for containing a bath of molten lead, means for imparting linear flow of the molten lead along the top side of the bath from a head end portion to a foot end portion of the bath, heating means for maintaining the lead in the bath in the molten state, inlet means overlying the head end portion of the bath of molten lead for the introduction of solid waste onto the underlying surface of the bath, outlet means communicating with a portion of the area within the enclosure above the bath for exhausting gases and vapors generated upon pyrolysis of organic material in the solid waste during movement with the bath from the head end portion to the foot end portion, a rake above the trough in the enclosure mounted for reciprocal lengthwise movement in a raised and lowered position with the movement being in the forwardly direction when in lowered position and in the backward direction when in raised position, said rake comprising a horizontally disposed frame and means depending from the frame for a distance to engage the solid waste when in lowered position and to be spaced above the solid waste when in raised position, and means for removal of residual solids from the bath at the foot end portion, in which the means depending from the rake frame comprise rake teeth extending downwardly from the frame in longitudinally spaced crosswise extending rows with the forwardmost row extending beyond the end of the trough when the rake is in the forward position, a dam at the end of the trough and in which the forwardmost row of rake teeth extend beyond the crest of the dam when in the forward position to sweep solids from the surface of the lead bath over the dam.

4. A device for treatment in transport of solid waste comprising an elongate enclosure, a trough having a bottom wall, a head end wall and a foot end wall and extending lengthwise in the bottom portion of said enclosure for containing a bath of molten lead, pump means submerged below the level of said bath for imparting linear flow of the molten lead along the top side of the bath from a head end portion to a foot end portion of the bath, a septum in said trough spaced above the bottom wall of said trough and also spaced from the head and foot end walls of said trough and extending longitudinally from said head end portion to said foot end portion to separate said bath into upper and lower zones, heating means exposed to the interior of said enclosure for introducing heat directly to the lead in said bath for maintaining the lead in the molten state, inlet means overlying the bath of molten lead for introduction of solid waste onto the underlying surface of the bath, outlet means communicating with a portion of the area within the enclosure above the bath for exhausting gases and vapors generated upon pyrolysis of organic matter in the solid waste during movement from the head end portion to the foot end portion, a dam at the end of the trough spaced from the end of said septum adjacent the foot end portion of the bath and having an extension from the bottom wall of said trough to a point above said septum, said lead bath filling said trough above and below said septum and to a level generally below the uppermost extension of said dam, said pump means for imparting linear flow causing said molten lead to flow from said head end portion to said foot end portion over the upper surface of said septum, downwardly between the end of said septum adjacent the foot end portion of said trough and said dam and below said septum back to the head end portion of said trough so that said molten lead circulates around said septum in said trough, and means above said trough and engageable with the solid waste lying on the surface of said lead bath in the area of said dam and movable toward sad dam to sweep solids from the surface of the lead bath over the dam, and a conveyor means extending crosswise of the enclosure immediately beyond said dam for receiving solids swept over said dam and operative to convey the solids so received.

5. The device of claim 4 wherein said conveyor means is partially filled with molten lead and includes displacement means within the conveyor means for displacement of solids entering the conveyor means, said conveyor means being partially filled with molten lead and pitched at an angle for gradual decrease in the depth of the molten lead in the trough and to provide for termination of the molten lead in the trough before termination of the means for displacement of the solids through the conveyor means whereby molten lead can drain back into the conveyor means while solids continue to be displaced through the conveyor means for a distance free of the molten lead and the exposure of said solids to molten lead is increased by the exposure of said solids to the lead in said conveyor means.

6. A device for treatment in transport of solid waste comprising an elongate enclosure, a trough having a bottom wall, a head end wall and a foot end wall and extending lengthwise in the bottom portion of said enclosure for containing a bath of molten lead, pump means submerged below the level of said bath for imparting linear flow of the molten lead along the top side of the bath from a head end portion to a foot end portion of the bath, a septum in said trough spaced above the bottom wall of said trough and also spaced from the head and foot end walls of said trough and extending longitudinally from said head end portion to said foot end portion to separate said bath into upper and lower zones, heating means exposed to the interior of said enclosure for introducing heat directly to the lead in said bath for maintaining the lead in the molten state, inlet means overlying the bath of molten lead for introduction of solid waste onto the underlying surface of the bath, outlet means communicating with a portion of the area within the enclosure above the bath for exhausting gases and vapors generated upon pyrolysis of organic material in the solid waste during movement from the head end portion to the foot end portion, a dam at the end of the trough spaced from the end of said septum adjacent the foot end portion of the bath and having an extension from the bottom wall of said trough to a point above said septum, said lead bath filling said trough above and below said septum and to a level generally below the uppermost extension of said dam, said pump means for imparting linear flow causing said molten lead to flow from said head end portion to said foot end portion over the upper surface of said septum, downwardly between the end of said septum adjacent the foot end portion of said trough and said dam and below said septum back to the head end portion of said trough so that said molten lead circulates around said septum in said trough, and means above said trough and engageable with the solid waste lying on the surface of said lead bath in the area of said dam and movable toward said dam to sweep said solids from the surface of the lead bath over the dam.

* * * * *